Figure 1:
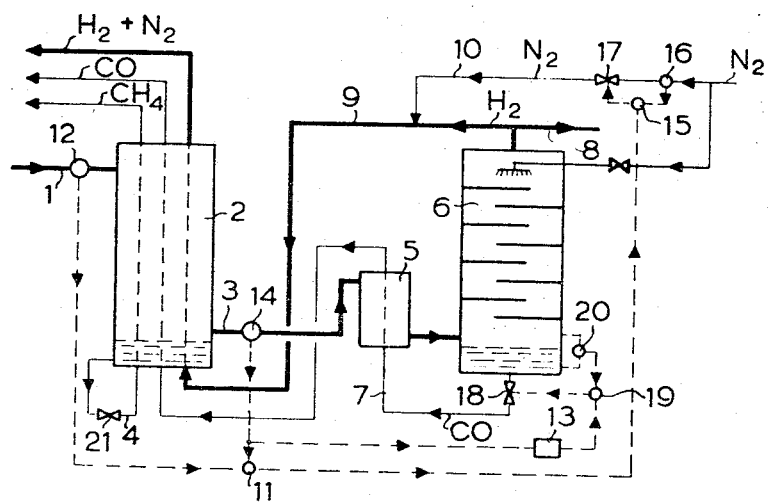

April 25, 1967        D. KORTLANDT ETAL        3,315,476
CONTROLLED NITROGEN ADDITION TO RECOVERED HYDROGEN
RESPONSIVE TO TEMPERATURE Filed Jan. 21, 1965        2 Sheets-Sheet 1

Inventors
David Kortlandt
Jacobus Th. Reutelingsperger
By Cushman, Darby & Cushman
Attorneys United States Patent Office 3,315,476
Patented Apr. 25, 1967

3,315,476
CONTROLLED NITROGEN ADDITION TO RECOVERED HYDROGEN RESPONSIVE TO TEMPERATURE
David Kortlandt, Geleen, and Jacobus Th. Reutelingsperger, Stein, Netherlands, assignors to Stamicarbon N.V., Heerlen, Netherlands
Filed Jan. 21, 1965, Ser. No. 426,921
Claims priority, application Netherlands, Jan. 24, 1964, 6,400,523
5 Claims. (Cl. 62—20)

The present invention relates to certain improvements in procedures and apparatus for separating a gas mixture rich in hydrogen. More particularly, the invention is concerned with improving procedures and apparatus for separating a gas mixture of the type indicated wherein the gas is split up into its constituents by cooling under pressure, the condensed fractions, after expansion, are used to indirectly exchange heat with the gas being separated, the remaining gaseous residue is scrubbed with liquid nitrogen in a scrubbing column, and nitrogen is supplied to the nitrogen-hydrogen mixture, thus obtained.

Separation procedures of the type indicated are known and, as recognized in the art, the supply or addition of nitrogen is necessary since the cooling effect supplied by indirect heat exchange with expanded condensed fractions is insufficient to establish the necessary temperature change in the gas mixture in the separating column. This temperature change is determinative of the efficiency of the separation of the fraction in question, so that the temperature of the gas mixture issuing from the separating column must be accurately maintained at the adjusted value.

The nitrogen is injected into the nitrogen-hydrogen mixture under high pressure, e.g. 200 at. gauge, and the desired cooling effect is caused by expansion of the nitrogen to the pressure of the mixture to which it is added (e.g. 13 at. gauge). Consequently, the nitrogen addition requires much energy and must be kept as small as possible.

It is difficult in known processes of the type indicated to maintain the temperature of the gas leaving the separating column at the required value under all conditions. The main reason is that the response of the process to a change in the nitrogen supply is very slow. There is a dead time of a few minutes, followed by a long operating time. Consequently, the nitrogen control does not satisfactorily offset rapid temperature fluctuations, even if unjustifiably large amounts of nitrogen are supplied. A temporarily too large supply of nitrogen results in a vigorous and prolonged fluctuation around equilibrium.

The principal object of the present invention is to provide a solution to the prior art problems mentioned above. Other objects will also be apparent.

In the process of the present invention, the amount of the condensed fraction supplied to the separating column to cool the gas therein is maintained constant on an average during the separation but provision is made to vary this amount as necessary depending on the temperature the uncondensed gas has when it leaves the separating column. Additionally, according to the invention, the amount of nitrogen added or supplied to the nitrogen-hydrogen mixture is made dependent on this temperature.

The present process contemplates that, if the measured temperature value for the gaseous residue from the separating column deviates from the desired value for one reason or another, the amount of condensed fraction used for indirectly cooling the same is only changed until the difference between the measured and the desired temperature values is eliminated. Thereafter, the amount of the fraction used for cooling goes back to the amount used before temperature adjustment became necessary. In other words, additional cooling or reduced cooling is supplied by the cooling fraction only temporarily, after which the excess or the deficiency is made up (this latter supply preferably taking place over a longer period), so that the average supply remains constant. This cannot be otherwise, since only a limited amount of this fraction is available, and an extra or a smaller amount can be supplied only temporarily, it being necessary afterwards to make up for this amount. However, the response of the process is much more rapid to a change in the amount of this fraction than to a change in the amount of nitrogen. Thus, there is virtually no dead time in contrast to prior procedures.

A gas-separating apparatus for carrying out the above process is preferably characterized by a temperature-sensitive element which reacts to the temperature the gas has when leaving the separating column and which is so connected as to operate a control device incorporated in a signal circuit between a volumeter for the condensed fraction in the scrubbing column and a valve in the discharge conduit of this fraction. The temperature-sensitive element may then be so connected as to operate a control device incorporated in the signal circuit between a volumeter for the gas to be separated and a device for controlling the amount of nitrogen to be supplied.

Existing gas-separating apparatus can be considerably improved by using the features of the present invention. Less supervision is required, and the efficiency is higher. Additionally, the control means are comparatively simple and cheap.

Figure 2A:
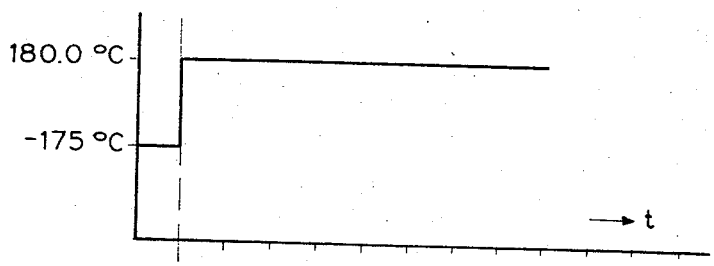
Figure 2B:
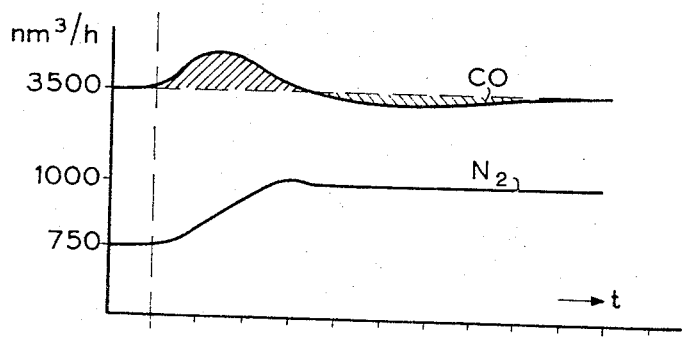
Figure 2C:
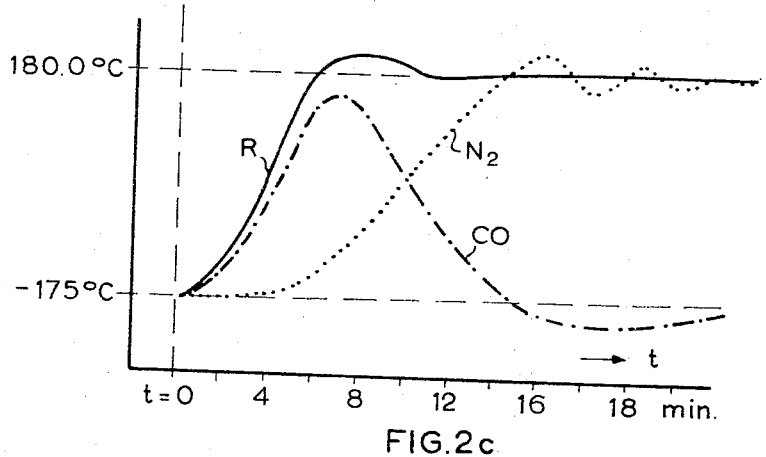

The invention is illustrated with reference to the drawing, in which FIGURE 1 schematically shows the essential parts of gas-separating apparatus according to the invention, and FIGURES 2a–2c show some diagrams relating to cases in which the desired value of the temperature is suddenly changed. More particularly, FIGURE 2a shows the extent to which the adjusted value of the temperature is changed at the moment $t=0$, FIGURE 2b shows the changes in the amount of nitrogen and in the amount of the said fraction, and FIGURE 2c shows the response to the changes in the above amounts.

The following example using a gas mixture formed in a coke oven (i.e. coke-oven gas), is given for the purpose of illustrating the invention.

Initially, it should be noted that before the gas mixture enters into a so-called methan column 2 through a conduit 1, benzole, nitrogen monoxide, hydrogen sulphide, prussic acid, and napthalene, which are contained in the coke-oven gas in small amounts and which, if not removed, would disturb the operation of the gas-separating apparatus, are removed in a gas-scrubbing process. After thus being scrubbed, the gas is also cooled to about $-100°$ C. and then passed through a column in which the so-called ethylene fraction is removed by cooling to a very constant temperature of, e.g., $-140°$ C. The remaining gas which is under pressure (e.g. 13.2 to 13.6 atmospheres gauge) and consists primarily of hydrogen, carbon monoxide and methane, enters into the part of the gas-separating apparatus that is important to the invention as shown in FIGURE 1 and hereinafter described.

In column 2, the gas mixture is cooled further by heat-exchange with effluent cold gases and the so-called methane fraction is separated off. To insure that the further gas separation proceeds effectively, the temperature of the gas issuing into conduit 3 must be accurately constant again, and amounts to, for instance, −180° C. The liquid fraction (methane) is collected in the bottom of the column and discharged through conduit 4. This fraction is allowed to expand to about atmospheric pressure in valve 21 and is then passed through column 2 in countercurrent relation to, and while indirectly exchanging heat with the gas mixture to be separated, so that the gas mixture is cooled further.

Through conduit 3 the gas to be further separated is first passed into a heat exchanger 5 where it is cooled further by exchanging heat with the evaporating liquid fraction (consisting of carbon monoxide and nitrogen) from scrubbing column 6, and then into the scrubbing column 6. In this column 6, the gas is scrubbed with liquid nitrogen, in order to remove the last traces of carbon monoxide, methane, etc., so that the temperature decreases still further. After being allowed to expand to virtually atmospheric pressure in a valve 18, the liquid fraction flowing from the bottom of this column 6 is passed, via conduit 7, through heat exchanger 5, in which it is partly evaporated, and subsequently through column 2, in which it is further evaporated to cool the gas flowing through this column.

The scrubbed gas leaving column 6 is a mixture of hydrogen and a small amount of nitrogen. Part of this mixture is discharged through conduit 8 to cool nitrogen and part of it is discharged through conduit 9 to help cool the gas in column 2. After leaving the gas-separating appartus as shown, both branches of gas discharged from scrubber 6 are again combined. If the hydrogen is to be used for preparing ammonia, the presence of nitrogen admixed therewith is no objection. On the contrary, even more nitrogen must be added thereto for this particular use.

The main feature of the separation system according to the invention is to maintain the temperature of the gas in conduit 3 as accurately as possible to, e.g. −180° C. To this end, provisions are made for an automatic system for controlling the amount of liquid nitrogen flowing into conduit 9 through conduit 10 and for a control system capable of temporarily altering the amount of liquid discharged through conduit 7. Naturally, the amount of liquid must on an average be kept at the value determined by the whole gas-separating process under stabilized conditions.

The amount of hydrogen in conduit 9 depends on the amount required in the part for cooling the nitrogen, to which conduit 8 is connected. Owing to various circumstances, the amount needed to cool nitrogen may change. If conduit 9 contains much hydrogen, little nitrogen is needed, and vice versa. Other variables in the process are the composition of the coke-oven gas, a sudden change in the amount of the coke-oven gas, a change in the inlet temperature of −140° C. caused by one or other failure, etc.

The amount of nitrogen is regulated by a control device 15 incorporated in a control circuit comprising a volumeter 16 and a regulating valve 17 in conduit 10. The control device 15 is actuated by a second control device 11 which, in turn, is actuated by a volumeter 12 in conduit 1 and by a temperature-sensitive element 14 which measures the difference between the temperatures of the gas contained in conduit 3 and an adjusted valve.

The apparatus as described so far automatically controls the exact amount of nitrogen on the basis of the temperature in conduit 3. However, the shape of the $N_2$ curve in FIGURE 2c shows that it takes minutes before the supply of nitrogen has any appreciable influence and, furthermore, that it takes a very long time before the desired temperature is again reached. The element 14, however, actuates a control device 19 in addition to the control device 11. This device 19 is incorporated in the circuit for controlling the liquid level in column 6 and can change the signal given by a volumeter 20 to a regulating valve 18 in the carbon monoxide conduit 7.

The influence of the element 14 on the device 19 is limited by a signal limiter 13. If too much of the fraction is discharged, the amount in column 6 will soon be used, so that control is no longer possible. If too little is discharged, the level in the column rises too much. Moreover, the process as a whole may be disturbed in both cases. Owing to the control system, the average amount contained per unit in conduit 7 remains constant, but this amount may be temporarily increased, which must be made up by a subsequent decrease. An additional amount of cold is, as it were, borrowed for a short period of time.

FIGURES 2a–2c shows what happens when, by means of the element 14, the desired temperature is shifted from −175° C. to −180.0° C. at the moment $t=0$ (FIGURE 2a). The amount of the fraction, indicated by CO for short, is 3500 m.³/h. (N.T.P.) at this moment, and the amount of $N_2$ 750 m.³/h. (N.T.P.) (FIGURE 2b), so that the temperature falls according to the curve R (FIGURE 2c). Without the control of CO the response would be as indicated by the $N_2$ curve (in FIGURE 2c). Due to the additional supply of CO, the temperature sooner reaches the desired value than could be effected by control of $N_2$ alone. The extra supply of CO soon decreases again and, under the influence of level controller 20, remains below 3500 m.³/h. (N.T.P.) for some time, so that the extra supply and the reduced supply are approximately equal. The hatched areas in FIGURE 2b are consequently equally large. CO in FIGURE 2c indicates the response curve for CO that would correspond to the CO curve in FIGURE 2b if the supply of $N_2$ should remain unchanged. The supply of nitrogen becomes again balanced at 1000 m.³/h. (N.T.P.) (FIGURE 2b). The element 14 actuates the control device 19, so that the valve 18 lets through more CO. When the temperature difference is eliminated, the device 19 and the valve 18 are again in their original positions. Volumeter 20 restores the original situation by controlling the valve 18 in the opposite way until the level in column 6 has reached its original height.

Due to the temperature difference at the element 14, the adjustment of the control device 11 is changed. In the case described above, this adjustment means more $N_2$. If no opposite signal is given, the device 11 remains in the changed position, so that the supply of more $N_2$ is continued.

As shown by the above example, the combined control system is much more rapid than the control system with $N_2$ alone. The desired value is sooner reached, and fluctuations around this value are sooner suppressed. In the circumstances, it will be appreciated that the invention provides a simple, efficient control system, which insures a better operation of the gas-separating apparatus.

It will be appreciated that a variety of gas compositions rich in hydrogen may be processed according to the invention. Usually, the hydrogen content of the gas, measured at one atmosphere and 25° C., will be 40 to 70%. Other major components in the gas will usually include the following:

| | Percent |
|---|---|
| Methane | 20 to 30 |
| Nitrogen | 2 to 10 |
| Carbon monoxide | 2 to 10 |

Coke oven gas, which is given above for purposes of illustration and is advantageously processed in the manner described herein, will usually have the following composition:

| | Percent |
|---|---|
| $H_2$ | 60–63 |
| $CH_4$ | 23–27 |
| $N^2$ | 4–6 |
| CO | 4–6 |
| $C_2H_4$ | 1.5–2 |

Optimum conditions using the system of FIGURE 1 for separating hydrogen from coke oven gas are:

Separating column 2

| | |
|---|---|
| Temperature, °C. | 140 to −180 |
| Pressure, at | 13.4 |
| Amount through line 4, nm.³/h. | 4000 |
| Amount through line 1, nm.³/h. | 29,000 |
| Amount of gaseous residue removed at 3, nm.³/h. | 25,000 |
| CO, nm.³/h. | 3500 |

Heat exchanger 5

| | |
|---|---|
| Temperature of gas leaving, °C. | −189 |
| Pressure of gas leaving at, | 12.4 |
| Ratio of cooling fraction to gas being cooled: | 1:8 |

Scrubber 6

| | |
|---|---|
| Temperature in column, °C. | −189 to −191 |
| Pressure in column, at | 12.36 |

Additional

| | |
|---|---|
| Ratio of gas breakdown between conduits 9 and 8 | 2.3:1 to 1.5:1 |
| Temperature and pressure of gas in conduit 9 | −191° C.; 12.32 at. |
| Temperature of fraction fed from exchanger 5 to separating column 2, °C. | −181 |
| Amount of nitrogen normally added through 10, nm³. | 400 |

Various modifications may be made in the invention described herein. Hence, the scope of the invention is defined in the following claims wherein we claim:

1. In a process for separating a gas mixture rich in hydrogen including the steps of feeding the gas mixture to a separating column and cooling the same therein under pressure to form a condensed fraction and leave a gaseous residue containing the hydrogen, removing the condensed fraction from the column and expanding the same, then passing the expanded fraction back through said column in indirect heat exchange relationship with the gas mixture therein to cool said mixture, withdrawing the gaseous residue from the column and scrubbing the same with liquid nitrogen in a scrubbing column to provide a scrubbed gas comprising nitrogen and hydrogen and another condensed fraction from said gas mixture, expanding said other condensed fraction and passing the same in indirect heat exchange relationship to the gas residue discharged from said separating column to cool the same prior to scrubbing and supplying additional nitrogen to the nitrogen-hydrogen gas obtained from said scrubbing column, the improvement which comprises maintaining the amount of said other condensed fraction substantially constant on an average during said separation but momentarily varying the amount of said other condensed fraction from said scrubbing column used to cool said gas mixture according to the temperature of gaseous residue withdrawn from the separating column and controlling the amount of nitrogen supplied to the nitrogen-hydrogen mixture depending upon said temperature.

2. The process of claim 1 wherein said gaseous mixture is coke oven gas wherein methane is condensed in said separating column and carbon monoxide is condensed in said scrubbing operation, the condensed carbon monoxide being passed in indirect heat exchange relationship to the gaseous residue from the separating column to cool the same prior to scrubbing, the amount of condensed carbon monoxide used for this purpose being dependent upon the temperature of the gaseous residue discharged from the separating column.

3. Gas separating apparatus comprising a separating column for separating a gas fraction by condensing the fraction, means for feeding a gas to be separated to said column, means for removing the condensed fraction from said column and expanding the same, means for passing the expanded fraction back through the separating column in indirect heat exchange relationship with said gas mixture to cool said mixture, means for removing the gaseous residue from said separating column, means for measuring the temperature of the removed gaseous residue, a scrubbing column for scrubbing said gaseous residue with liquid nitrogen to condense another fraction of said gas mixture, means for supplying nitrogen to said scrubbing column to scrub said gas therein, means for withdrawing said other condensed fraction from said scrubbing column, means for withdrawing scrubbed gas from said scrubbing column, means for adding nitrogen to the withdrawn gas and means for feeding the mixture of withdrawn gas and added nitrogen to said separating column to cool the gas therein by indirect heat exchange, and control means operatively associated with the temperature measuring means for regulating the amount of nitrogen added to the gas from said scrubbing column and the amount of condensed fraction from said scrubbing used to cool the gaseous mixture, dependent upon the temperature of the gas withdrawn from said separating column.

4. The apparatus of claim 3 wherein the control means include a temperature sensitive element, a volumeter for measuring the amount of the condensed fraction in the scrubbing column, a valve for regulating discharge of the fraction from the scrubbing column and a signal circuit between the volumeter and valve including a control operatively associated with said element.

5. Gas separating apparatus according to claim 4 including a volumeter for the gas to be separated and a signal circuit between said volumeter and the means for adding nitrogen and operatively associated therewith, said circuit including a control device operatively associated with said temperature sensitive element.

References Cited by the Examiner

UNITED STATES PATENTS

| | | | |
|---|---|---|---|
| 1,830,610 | 11/1931 | Linde | 62—20 |
| 1,913,805 | 6/1933 | Hausen | 62—23 X |
| 2,844,944 | 7/1958 | Becker | 62—20 X |
| 2,895,304 | 7/1959 | Wucherev et al. | |
| 2,936,593 | 5/1960 | Grumberg. | |
| 3,255,596 | 6/1966 | Greco et al. | 62—21 X |

FOREIGN PATENTS

| | | |
|---|---|---|
| 231,444 | 3/1924 | Great Britain. |

NORMAN YUDKOFF, *Primary Examiner.*

V. W. PRETKA, *Assistant Examiner.*